United States Patent
Lee et al.

(10) Patent No.: US 12,349,020 B2
(45) Date of Patent: *Jul. 1, 2025

(54) SESSION MANAGEMENT METHOD BASED ON REALLOCATION OF PDU SESSION ANCHOR DEVICE, AND DEVICE PERFORMING THE SESSION MANAGEMENT METHOD

(71) Applicant: ELECTRONICS AND TELECOMMUNICATIONS RESEARCH INSTITUTE, Daejeon (KR)

(72) Inventors: Soohwan Lee, Daejeon (KR); Dongmyoung Kim, Sejong-si (KR); Myung Ki Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,194

(22) Filed: Dec. 29, 2023

(65) Prior Publication Data

US 2024/0147310 A1    May 2, 2024

Related U.S. Application Data

(63) Continuation of application No. 17/536,609, filed on Nov. 29, 2021, now Pat. No. 11,895,539, which is a
(Continued)

(30) Foreign Application Priority Data

Mar. 21, 2017   (KR) .................. 10-2017-0035604
Aug. 16, 2017   (KR) .................. 10-2017-00103670
Dec. 7, 2017    (KR) .................. 10-2017-0167798

(51) Int. Cl.
  *H04W 36/12*    (2009.01)
  *H04L 67/14*    (2022.01)
  (Continued)

(52) U.S. Cl.
  CPC ............. *H04W 36/12* (2013.01); *H04L 67/14* (2013.01); *H04W 36/0019* (2023.05);
  (Continued)

(58) Field of Classification Search
  CPC ..... H04L 47/12; H04L 47/32; H04L 61/6077; H04L 67/148; H04L 61/5007;
  (Continued)

(56) References Cited

U.S. PATENT DOCUMENTS 8,208,440 B2    6/2012  Kim et al.
2005/0177620 A1 8/2005  Lee et al.
(Continued)

FOREIGN PATENT DOCUMENTS

KR    10-2017-0004079    1/2017

OTHER PUBLICATIONS

3GPP TS 23.501 V0.3.1 (Mar. 2017); 3rd Generation Partnership Project; Technical Specification Group Services and System Aspects; System Architecture for the 5G System; Stage 2 (Release 15).
(Continued)

*Primary Examiner* — Michael Thier
*Assistant Examiner* — Prince A Mensah
(74) *Attorney, Agent, or Firm* — LRK PATENT LAW FIRM

(57) ABSTRACT

Disclosed is a session management method based on protocol data unit (PDU) session anchor (PSA) relocation, and a device performing the session management method. The session management method may include determining to perform PSA relocation, establishing a new PSA device through the PSA relocation, and releasing an existing PSA
(Continued)

device, in which the PSA relocation may allow traffic moving towards the existing PSA device to move to the new PSA device.

20 Claims, 8 Drawing Sheets

Related U.S. Application Data continuation of application No. 16/796,487, filed on Feb. 20, 2020, now Pat. No. 11,190,988, which is a continuation of application No. 15/927,582, filed on Mar. 21, 2018, now Pat. No. 10,575,220.

(51) Int. Cl.
*H04W 36/00* (2009.01)
*H04W 80/04* (2009.01)
*H04L 61/5007* (2022.01)
*H04L 101/677* (2022.01)
*H04W 8/28* (2009.01)

(52) U.S. Cl.
CPC .... *H04L 61/5007* (2022.05); *H04L 2101/677* (2022.05); *H04W 8/28* (2013.01); *H04W 80/04* (2013.01)

(58) Field of Classification Search
CPC .... H04L 67/14; H04L 2101/677; H04W 8/28; H04W 12/06; H04W 24/08; H04W 36/0022; H04W 36/12; H04W 72/0493; H04W 76/15; H04W 80/04; H04W 36/0019

See application file for complete search history.

(56) References Cited

U.S. PATENT DOCUMENTS

| | | |
|---|---|---|
| 2008/0039106 A1 | 2/2008 | Wallentin et al. |
| 2011/0069837 A1 | 3/2011 | Song et al. |
| 2012/0163296 A1 | 6/2012 | Cheon et al. |
| 2015/0381493 A1 | 12/2015 | Bansal et al. |
| 2017/0134954 A1 | 5/2017 | Speight |
| 2018/0192471 A1 | 7/2018 | Li et al. |
| 2018/0199243 A1 | 7/2018 | Bharatia |
| 2018/0227743 A1 | 8/2018 | Faccin et al. |
| 2018/0248792 A1* | 8/2018 | Zhou .................... H04L 69/325 |
| 2018/0270888 A1* | 9/2018 | Faccin .................. H04W 76/20 |

OTHER PUBLICATIONS

3GPP TS 23.502 V0.2.0 (Feb. 2017); 3rd Generation Partnership Project; Technical Specification Group Services and System Aspects; Procedures for the 5G System, Stage 2 (Release 15).

Annika Klockar et al., "Network Controlled Mobility Management with Policy Enforcement Towards IMT-A", 2008 International Conference on Communications, Circuits and Systems, IEEE., 2008, pp. 139-143.

* cited by examiner

SESSION MANAGEMENT METHOD BASED ON REALLOCATION OF PDU SESSION ANCHOR DEVICE, AND DEVICE PERFORMING THE SESSION MANAGEMENT METHOD

CROSS-REFERENCE TO RELATED APPLICATIONS

This application is a continuation of U.S. patent application Ser. No. 17/536,609, filed on Nov. 29, 2021, which is a continuation of U.S. patent application Ser. No. 16/796,487, filed on Feb. 20, 2020, now U.S. Pat. No. 11,190,988, issued on Nov. 30, 2021, which is a continuation of U.S. patent application Ser. No. 15/927,582, filed on Mar. 21, 2018, now U.S. Pat. No. 10,575,220, issued on Feb. 25, 2020, which claims the priority benefit of Korean Patent Application No. 10-2017-0035604, filed on Mar. 21, 2017, Korean Patent Application No. 10-2017-0103670, filed on Aug. 16, 2017, and Korean Patent Application No. 10-2017-0167798, filed on Dec. 7, 2017, in the Korean Intellectual Property Office, the disclosures of which are incorporated herein by reference for all purposes.

BACKGROUND

1. Field of the Invention

One or more example embodiments relate to a session management method based on a relocation of a protocol data unit (PDU) session anchor (PSA) device, and an device performing the session management method.

2. Description of Related Art

Mobile edge computing (MEC) technology is proposed to provide user equipment (UE) with a low-latency data service. The MEC technology is used to minimize a round-trip time (RTT) between the UE and a server providing a service requested by the UE. The MEC technology relates to reducing the number of routing hops between the UE and the server, and also positioning a geopolitical position of the server closer to the UE.

A fifth-generation (5G) mobile communications network requires that various services are provided to UE through 5G network technology. Thus, the 5G mobile communications network supports edge computing technology to provide a service of an enhanced quality compared to an existing established network.

SUMMARY

An aspect provides a method and device that, when there is a plurality of edge clouds in a fifth-generation (5G) core network (CN) system, may provide load balancing between the edge clouds by changing an edge cloud or resetting a 5G local gateway to support a lifecycle of a virtualized 5G local gateway.

Another aspect also provides a method and device that may provide service flexible to load and connected or continuous despite a movement or mobility of user equipment (UE) by resetting a 5G local gateway, although new UE, in addition to exiting UE, is connected in a 5G CN system.

According to an aspect, there is provided a method to be performed by a session management function (SMF) device in a network, the method including determining to perform protocol data unit (PDU) session anchor (PSA) relocation for a PDU session, establishing a new PSA device through the PSA relocation, and releasing an existing PSA device. The PSA relocation may allow traffic moving towards the existing PSA device to move to the new PSA device.

The SMF device may perform the PSA relocation for Internet Protocol version 6 (IPv6) multihoming or an uplink classifier.

The SMF device may perform the PSA relocation in response to an event benefiting from the PSA relocation for the IPv6 multihoming or the uplink classifier or a request from an application function.

The SMF device may transmit a session establishment request to the new PSA device, and provide the new PSA device with a tunnel identifier (ID) of a branching point to be installed, an uplink classifier, and packet detection, enforcement, and reporting rules.

The SMF device may transmit, to a user plane function (UPF) device corresponding to a branching point or an uplink classifier, a session modification request in accordance with a new IPv6 prefix allocated to the new PSA device to update an uplink traffic filter.

The session modification request may include an ID of a traffic filter for which the PSA relocation is needed and a tunnel ID of the new PSA device.

When the UPF device corresponding to the branching point or the uplink classifier successfully updates all traffic filters for which the SMF device requests modification, the UPF device corresponding to the branching point or the uplink classifier may acknowledge the modification with a session modification response.

The SMF device may transmit, to the existing PSA device, a session release request including a session ID, and the existing PSA device may release tunnel resources and contexts associated with the PDU session.

When the existing PSA device successfully releases the tunnel resources and contexts associated with the PDU session, the existing PSA device may transmit a session release response including the session ID to the SMF device.

The network may support a session and service continuity (SSC) mode associated with the PDU session, and the SSC mode may not change during a lifetime of the PDU session.

According to another aspect, there is provided an SMF device in a network, the SMP device that may determine to perform PSA relocation for a PDU session, establish a new PSA device through the PSA relocation, and release an existing PSA device. The PSA relocation may allow traffic moving towards the existing PSA device to move to the new PSA device.

The SMF device may perform the PSA relocation for IPv6 multihoming or an uplink classifier.

The SMF device may perform the PSA relocation in response to an event benefiting from the PSA relocation for the IPv6 multihoming or the uplink classifier or a request from an application function.

The SMF device may transmit a session establishment request to the new PSA device, and provide the new PSA device with a tunnel ID of a branching point to be installed, an uplink classifier, and packet detection, enforcement, and reporting rules.

The SMF device may transmit, to an UPF device corresponding to a branching point or an uplink classifier, a session modification request in accordance with a new IPv6 prefix allocated to the new PSA device to update an uplink traffic filter.

The session modification request may include an ID of a traffic filter for which the PSA relocation is needed and a tunnel ID of the new PSA device.

When the UPF device corresponding to the branching point or the uplink classifier successfully updates all traffic filters for which the SMF device requests modification, the UPF device corresponding to the branching point or the uplink classifier may acknowledge the modification with a session modification response.

The SMF device may transmit, to the existing PSA device, a session release request including a session ID, and the existing PSA device may release tunnel resources and contexts associated with the PDU session.

When the existing PSA device successfully releases the tunnel resources and contexts associated with the PDU session, the existing PSA device may transmit a session release response including the session ID to the SMF device.

The network may support an SSC mode associated with the PDU session, and the SSC mode may not change during a lifetime of the PDU session.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
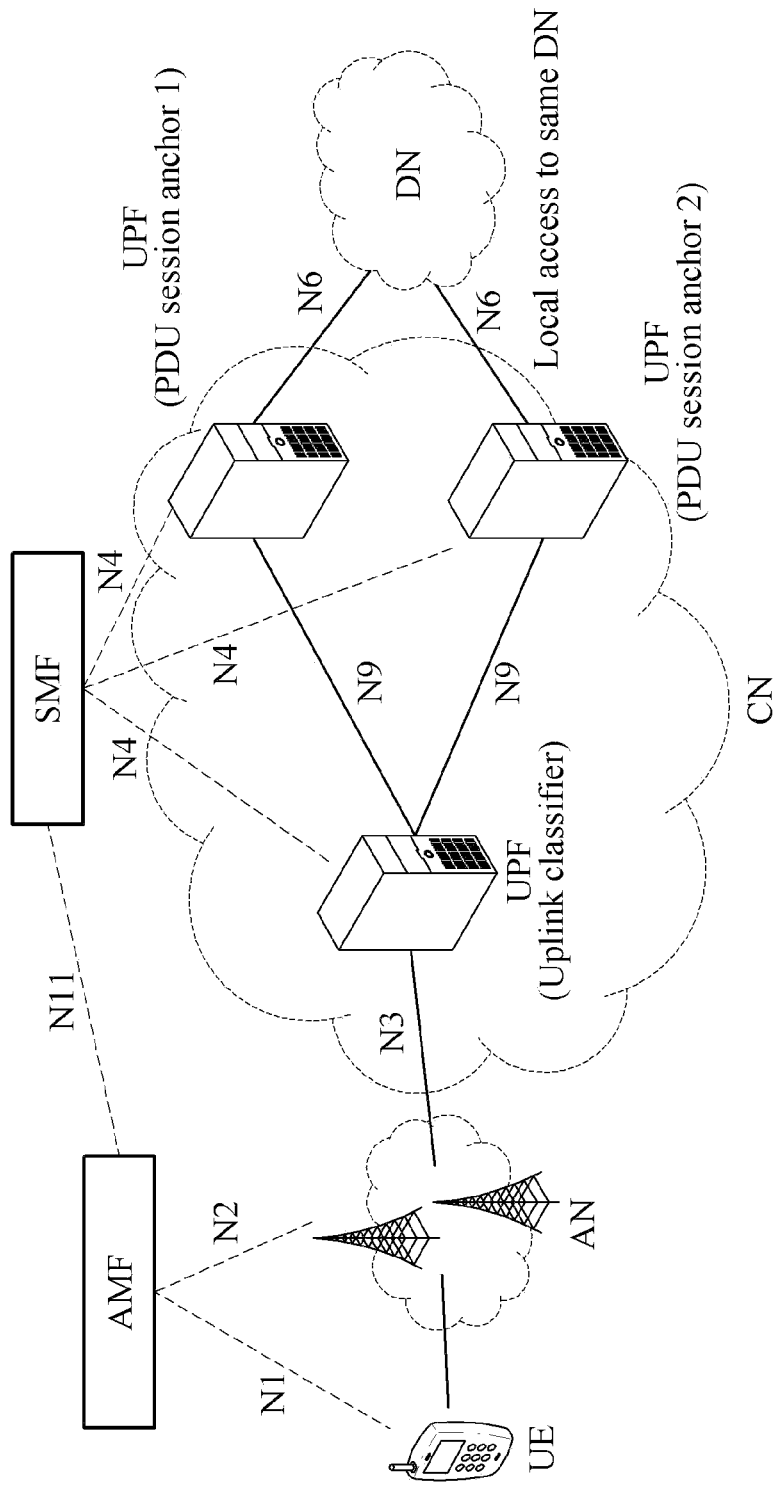
FIG. 1 is a diagram illustrating a core network (CN) including a user plane function (UPF) device corresponding to an uplink classifier according to an example embodiment.

The following detailed description is provided to assist the reader in gaining a comprehensive understanding of the methods, devices, and/or systems described herein. However, various changes, modifications, and equivalents of the methods, devices, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, devices, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings.

Terms, definitions, and abbreviations used herein are as follows:

A fifth-generation (5G) access network (AN) includes a next generation radio access network (NG-RAN) or a non-third generation partnership project (3GPP) (non-3GPP) connected to a 5G core network (CN).

A 5G CN is connected to a 5G AN.

A protocol data unit (PDU) connectivity service refers to a service that provides an exchange of PDUs between user equipment (UE) and a data network (DN).

A PDU session refers to an association between UE and a DN to provide a PDU connectivity service.

A PDU session type refers to a type of PDU session, and includes Internet Protocol version 4 (IPv4), IPv6, Ethernet, and the like.

In addition, a session management function (SMF), an access and mobility management function (AMF), and a user plane function (UPF) that are described herein are software functions, but may be installed or performed in a single hardware or each of multiple hardware.

Figure 2:
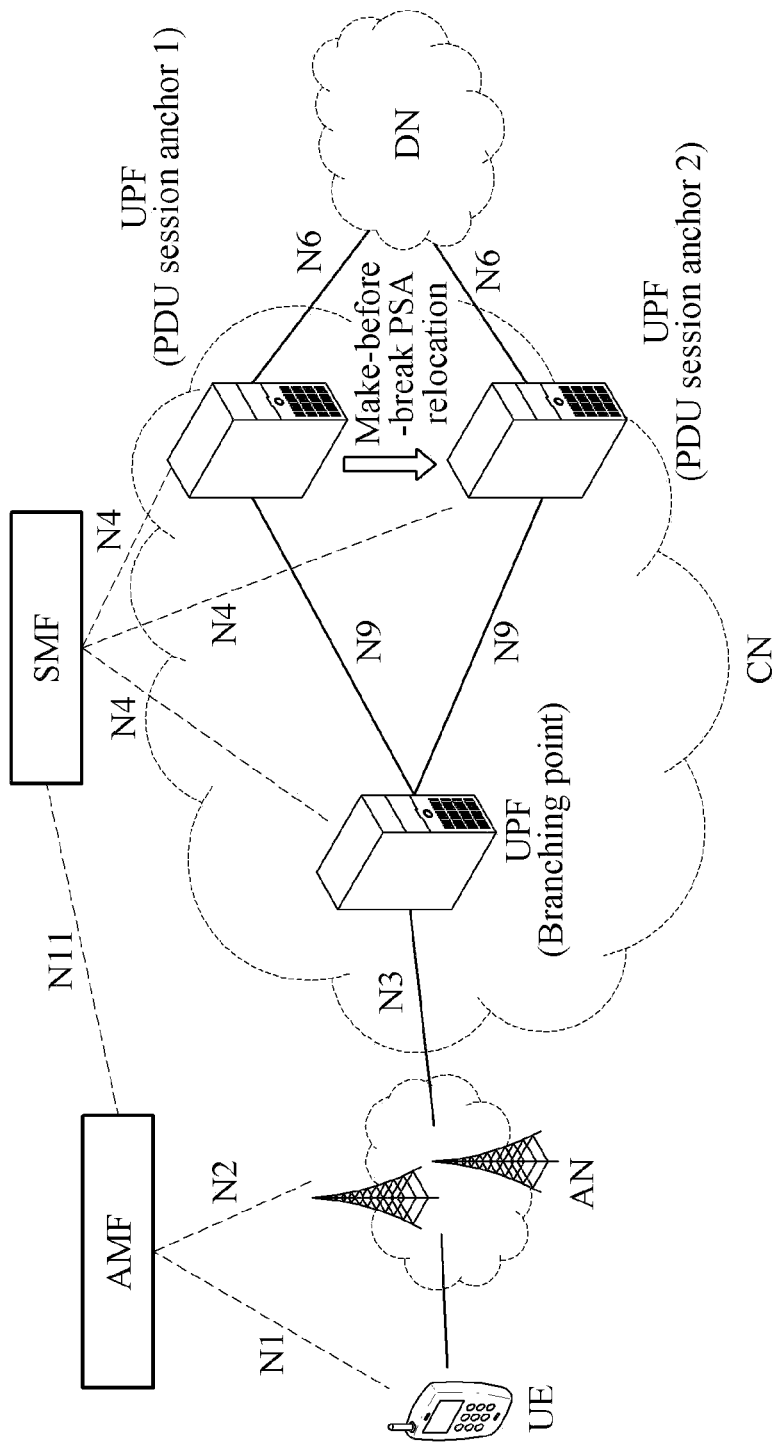
FIG. 2 is a diagram illustrating a CN including an UPF device corresponding to a branching point for service continuity according to an example embodiment.
Figure 3:
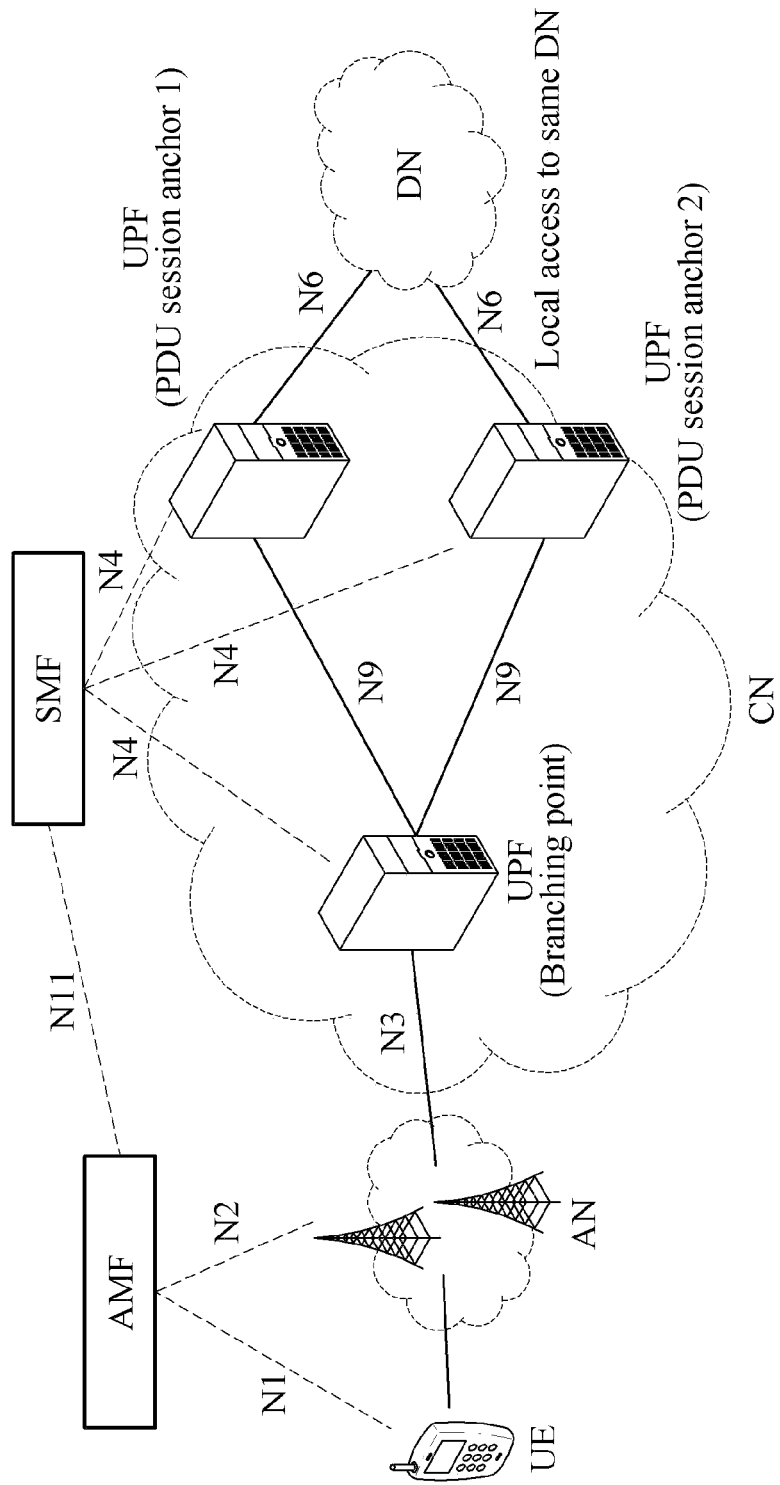
FIG. 3 is a diagram illustrating a CN including an UPF device corresponding to a branching point for local access to a same data network (DN) according to an example embodiment.

Further, definitions of reference points in a 5G system illustrated in FIGS. 1 through 3 are as follows:
- N1 indicates a reference point between UE and an AMF.
- N2 indicates a reference point between an (R)AN and an AMF.
- N3 indicates a reference point between an (R)AN and an UPF.
- N4 indicates a reference point between an SMF and an UPF.
- N6 indicates a reference point between an UPF and a DN.
- In N6, traffic is forwarded between an UPF device acting as an uplink (UL) classifier (CL) (UL CL) and a local DN.
- N9 indicates a reference point between two UPFs.

<Session Management>

A 5G CN supports a PDU connectivity service, for example, a service that provides an exchange of PDUs between UE and a DN. The PDU connectivity service is supported via PDU sessions that are established upon request from the UE.

Subscription information includes multiple DN names and a default DN name. In a case in which a valid DN name is not provided in response to a PDU session establishment request, or a request for establishing a PDU session, that is transmitted to the 5G CN, the UE may be assigned to the default DN name.

Each PDU session supports a single PDU session type. For example, a PDU session supports an exchange of a single type of PDU session requested by the UE at the establishment of the PDU session.

In the 5G CN, a PDU session is established upon request from the UE, modified upon request from the UE and the 5G CN, and released upon request from the UE and the 5G CN.

<User Plane Management>

User plane management handles a user plane path of PDU sessions. A PDU session supports a deployment of a single UPF device or multiple UPF devices for the given PDU session. The number of UPF devices for a PDU session is not restricted.

For a PDU session of an IPv4 or IPv6 type, a PDU session anchor (PSA) may be an Internet Protocol (IP) anchor point of an IP address/prefix allocated to UE. For an IPv4-type PDU session or an IPv6 multihomed PDU session, when an UL CL is used and multiple PSAs are used, a single PSA may be an IP anchor point for the PDU session. For an IPv6 multihomed PDU session, there are multiple IP anchor points.

<Single PDU Session with Multiple PSAs>

In order to support selective traffic routing for a DN or to support session and service continuity (SSC) mode 3, an SMF device may control a data path of a PDU session so that the PDU session may simultaneously correspond to multiple N6 interfaces. An UPF device may terminate these N6 interfaces to support PSA functionality. Each PSA supporting a PDU session supports a different access to a same DN, and corresponds to an UPF device. A PSA assigned to establish a PDU session is associated with an SSC mode of the PDU session. In addition, additional PSAs assigned to the same PDU session, e.g., for the selective traffic routing to the DN are independent of the SSC mode of the PDU session.

The selective traffic routing to the DN supports, for example, deployments where some selected traffic is forwarded, on an N6 interface, to the DN that is close to an AN serving UE.

There are two processing methods or modes used to process a PDU session.
  (1) FIG. 1 illustrates an UL CL mode based on UL CL functionality for a PDU session.
  (2) FIGS. 2 and 3 illustrate an IPv6 multihoming mode based on IPv6 multihoming for a PDU session.

<UL CL Mode: A Method of Processing an UL CL for a PDU Session>

As illustrated in FIG. 1, in a PDU session of IPv4 or IPv6, or Ethernet, an SMF device may insert an UL CL in a data path of the PDU session. Herein, the inserting of an UL CL indicates inserting an UPF device corresponding to the UL CL in the data path from UE to a DN in a 5G CN.

The UL CL refers to functionality supported by UPF device, and is used to divert (locally) some traffic matching traffic filters provided by the SMF device. Such an insertion and removal of an UL CL is determined or controlled by the SMF device using generic N4 and UPF capabilities. The SMF device includes at least one UPF device supporting the UL CL functionality in the data path in the PDU session.

The UE is unaware of traffic diversion by the UL CL, and is not involved in both the insertion and the removal of the UL CL. In a case of a PDU session of IP types, the UE associates the PDU session with either a single IPv4 address or a single IPv6 prefix that is allocated by a network.

When the UL CL functionality is inserted in the data path of the PDU session, there are multiple PSAs for the PDU session. These PSAs provide different accesses to a same DN. Referring back to FIG. 1, the UPF device is an UPF device supporting the UL CL functionality, and an UPF device supporting PSA functionality.

The UL CL provides UL traffic forwarding towards different PSAs, and merges downlink (DL) traffic to the UE. Herein, the traffic from the different PSAs may be merged on a link towards the UE. The merging of the traffic may be based on traffic detection and traffic forwarding rules provided by the SMF device.

The UL CL applies filtering rules, and determines how a packet will be routed. Herein, the filtering rules indicate examining a destination IP address or a prefix of UL IP packets that is transmitted by the UE. The UPF device supporting the UL CL may also be controlled by the SMF device to support traffic measurement for charging traffic replication for LI and a bit rate enforcement (per PDU session-aggregate maximum bit rate [AMBR]).

For the PDU session for the UL CL, an UL and DL session-AMBR is defined by the SMF device selected by the UPF device supporting the UL CL functionality.

In addition, the UPF device supporting the UL CL may also support a PSA for connectivity to local access to the DN. For example, the UPF device may support tunnelling or network address translation (NAT) on N6. The UPF device may be controlled by the SMF device.

Additional UL CLs or additional PSAs may be inserted in the data path of the PDU session to generate new data paths for the same PDU session. How to organize a data path of all UL CLs in a PDU session is based on an operator configuration and SMF logic. In addition, there is only one UPF device supporting an UL CL connecting it to an AN through an N3 interface.

FIG. 1 illustrates an example of how an UPF device is inserted in a data path of a PDU session. A same UPF may support both UL CL functionality and PSA functionality. In an UL CL mode illustrated in FIG. 1, UE may not be involved in a procedure for service continuity, and an SMF device may selectively release an existing PSA in the UL CL mode.

<IPv6 Multihoming Mode: A Method of Processing an IPv6 Multihome for a PDU Session>

A PDU session may be associated with multiple IPv6 prefixes, which is referred to as a multihomed PDU session. The multihomed PDU session provides access to a DN via one or more PSAs. Herein, different user plane paths leading to different PSAs branch out at a common UPF that is referred to as an UPF supporting branching point functionality. Herein, a branching point provides UL traffic forwarding towards the different PSAs, and merges traffic from the different PSAs towards UE on a link.

The UPF device supporting the branching point functionality may also be controlled by an SMF device to support traffic measurement for charging traffic replication for LI and bit rate enforcement per PDU session AMBR. The insertion and removal of the UPF device supporting the branching point may be determined or controlled by the SMF device using generic N4 and UPF capabilities. The SMF device may decide to insert the UPF device supporting the branching point functionality in a data path of a PDU session during or after establishment of the PDU session. Alternatively, the SMF device may decide to remove the UPF device supporting the branching point functionality from the data path of the PDU session after the establishment of the PDU session.

The multihoming of the PDU session may be applied to PDU sessions of IPv6 type. A request of a PDU session type "IP" or "IPv6" implies supporting a multihomed PDU session for IPv6 in the UE.

Using multiple IPv6 prefixes in a PDU session may have the following characteristics. The UPF device supporting the branching point functionality is configured by the SMF device to spread UL traffic between IP anchors based on a source prefix of a PDU. The source prefix may be selected by the UE based on routing information and preferences received from a network.

The Internet Engineering Task Force (IETF) Request for Comments (RFC) 4191 is used to configure the routing information and the preferences into the UE to influence the selection of the source prefix. This corresponds to "IPv6 multihoming without network address translation (NAT)," scenario 1 defined in the IETF RFC. This allows the branching point to be generated without being aware of routing table in a DN, and a first hop router function to be kept in the IP anchors.

As illustrated in FIG. 2, a multihomed PDU session may be used to support make-before-break service continuity to support SSC mode 3.

In addition, as illustrated in FIG. 3, a multihomed PDU session may also be used to support cases where UE needs to access both a local service (e.g., a local server) and a central service (e.g., Internet).

The UE may use a method associated with "Relocation of SSC mode 3 PSA with IPv6 multihomed PDU session," to determine whether the multihomed PDU session is used to support service continuity or it is used to support local access to a DN.

According to an example embodiment, an UPF device may support both branching point functionality and PSA functionality.

<Session and Service Continuity (SSC)>

Supporting SSC in 5G system architecture enables to address various continuity requirements of different applications and services for UE. A 5G system supports different SSC modes. An SSC mode associated with a PDU session does not change during a lifetime of the PDU session.

With SSC mode 1, a network may preserve a connectivity or continuity service provided to the UE. For a case of a PDU session of an IPv4 or IPv6 type, an IP address is preserved.

With SSC mode 2, the network may release a connectivity or continuity service delivered to the UE and a PDU session corresponding to the connectivity or continuity service. For a case of an IPv4 or IPv6 type, the network may release IP addresses that had been allocated to the UE.

With SSC mode 3, changes to a user plane may be visible to the UE, while the network may ensure that the UE suffers no loss of connectivity. A connection through a new PSA is established before a previous connection is terminated in order to allow for better service continuity. For a case of an IPv4 or IPv6 type, an IP address is not preserved in this mode when the PSA changes.

The addition or removal procedure of an additional PSA in a PDU session for local access to a DN is independent from an SSC mode of the PDU session.

<SSC Mode>

(1) SSC Mode 1

For a PDU session of SSC mode 1, an UPF acting as a PSA at the establishment of the PDU session is maintained regardless of access technique, for example, an access type and cells, which is for UE to successfully access a network.

In a case of a PDU session of an IPv4 or IPv6 type, IP continuity is supported regardless of UE mobility events.

When an IPv6 multihoming or an UL CL applies to the PDU session of SSC mode 1, the network allocates additional PSAs to the PDU session based on local policies. These additional PSAs may be released or allocated, and the UE does not expect that an additional IPv6 prefix is maintained during a lifetime of the PDU session. SSC mode 1 may apply to any PDU session types or any access types.

(2) SSC Mode 2

In a case in which a PDU session of SSC mode 2 has a single PSA, the network may trigger a release of the PDU session and instruct the UE to establish a new PDU session to a same DN immediately. A trigger condition depends on an operator policy, for example, a request from an application function based on a load status and the like. At the establishment of the new PDU session, a new UPF acting as a PSA may be selected.

Otherwise, in a case in which the PDU session of SSC mode 2 has multiple PSAs, for example, in a case in which a multihomed PDU session or an UL CL applies to the PDU session of SSC mode 2, additional PSAs may be released or allocated.

SSC mode 2 may apply to any PDU session types and access types. In an UL CL mode, the UE is not involved in PSA reallocation so that the existence of multiple PSAs is not visible to the UE.

(3) SSC Mode 3

For a PDU session of SSC mode 3, the network allows the establishment of UE connectivity to a same DN via a new PSA before connectivity between the UE and a previous PSA is released. With trigger conditions applied, the network decides whether to select an UPF supporting a PSA suitable for UE's new conditions, for example, a point of attachment to the network.

SSC mode 3 may apply to any PDU session types and any access types.

In a case of a PDU session of an IPv4 or IPv6 type, a procedure of changing a PSA is performed. A new IP prefix anchored on a new PSA may be allocated within the same PDU session (relying on IPv6 multihoming). Alternatively, the new IP prefix may apply to a case of a PDU session setup in SSC mode 3 or additional PSAs of the PDU session established in SSC mode 1. The new IP address or the new IP prefix may be allocated within a new PDU session for which the establishment is triggered by the UE.

After the new IP address or the new IP prefix has been allocated, the old IP address or prefix is maintained during some time indicated to the UE and then released.

In a case in which the PDU session of SSC mode 3 has multiple PSAs, for example, in a case of a multihomed PDU session or in case an UL CL applies to the PDU session of SSC mode 3, additional PSAs may be released or allocated.

<SSC Mode Selection>

An SSC mode selection policy may be used to determine a session type or a type of SSC mode associated with an application or group of applications for UE.

It is possible for an operator to provide the UE with the SSC mode selection policy. The SSC mode selection policy includes one or more SSC mode selection policy rules that may be used by the UE to determine a type of SSC mode associated with an application or group of applications. The SSC mode selection policy may also include a default SSC mode selection policy rule that matches all applications of the UE.

When an application requests data transmission, for example, opening a network socket, and the application itself does not specify a required SSC mode, the UE determines an SSC mode associated with this application by using the SSC mode selection policy. In addition, the following behavior applies for the UE and network.

a) In a case in which the UE has an already established PDU session that matches the SSC mode associated with the application, the UE routes data of the application within this PDU session unless other conditions in the UE do not permit the use of this PDU session. Otherwise, the UE requests the establishment of a new PDU session that matches the SSC mode associated with the application.

b) The SSC mode associated with the application is either an SSC mode included in a non-default SSC mode selection policy rule that matches the application, or an SSC mode included in the default SSC mode selection policy rule, if present. In a case in which the SSC mode selection policy does not include a default mode selection policy rule and no other rule matches the application, the UE requests a PDU session without providing the SSC mode. In this case, the network determines the SSC mode of the PDU session.

The SSC mode selection policy rule provided to the UE may be updated by the operator.

An SMF device receives, from a unified data management (UDM) device, a list of supported SSC modes and the default SSC mode per data network name (DDN) as part of subscription information.

In a case in which the UE provides an SSC mode when requesting a new PDU session, the SMF device selects the SSC mode by either accepting the requested SSC mode or modifying the requested SSC mode based on subscription or local configuration.

In a case in which the UE does not provide an SSC mode when requesting a new PDU session, the SMF device selects a default SSC mode for a DN that is listed in the subscription or applies local configuration to select the SSC mode.

In a case in which a static IP address/prefix is allocated to a PDU session, SSC mode 1 may be assigned to the PDU session based on the static IP address/prefix subscription for the DNN and single network slice selection assistance information (S-NSSAI).

Figure 4:
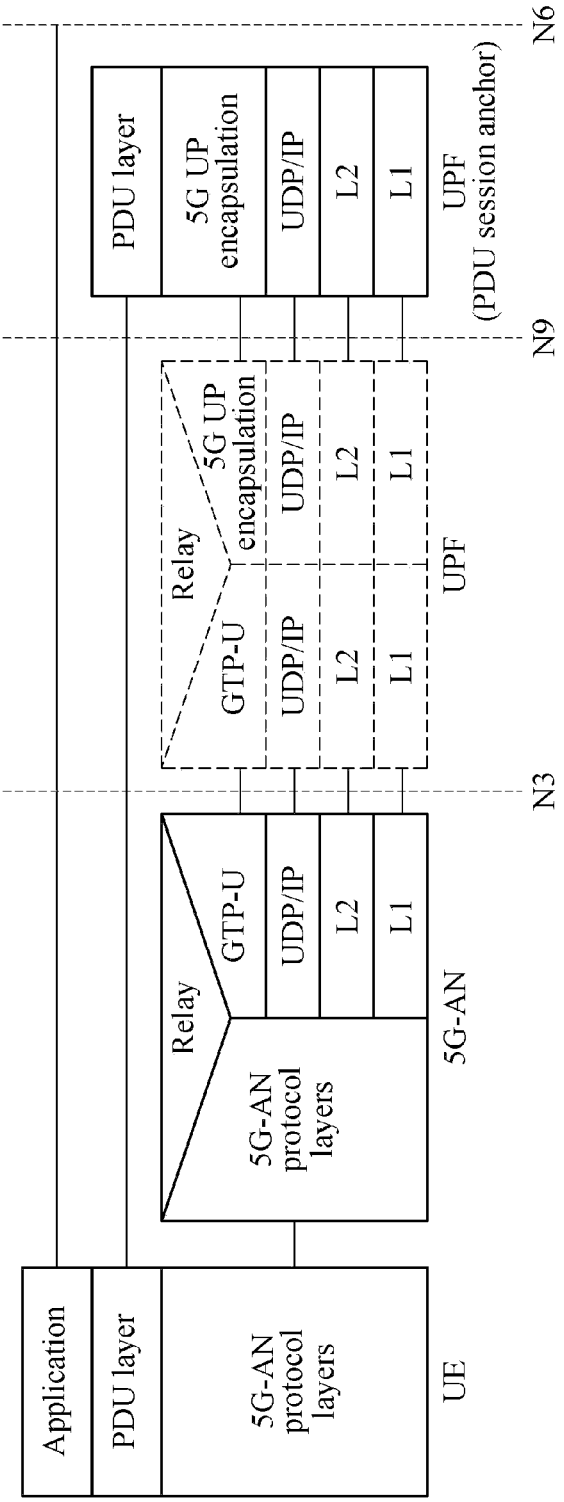
FIG. 4 is a diagram illustrating a protocol stack for a protocol data unit (PDU) session according to an example embodiment.

FIG. 4 is a diagram illustrating a protocol stack for a PDU session according to an example embodiment.

FIG. 4 illustrates a protocol stack for a user plane transport associated with a PDU session.

PDU layer: This layer corresponds to a PDU carried between UE and a DN over a PDU session. In a case of a PDU session type being IPv6, the PDU layer corresponds to IPv6 packets. In a case of a PDU session type being Ethernet, the PDU layer corresponds to Ethernet frames.

General packet radio service (GPRS) tunneling protocol for a user plane (GTP-U): This GTP-U protocol supports multiplexing traffic of different PDU sessions (possibly corresponding to different PDU session types) by tunneling user data over N3, for example, an interface between a 5G AN node and an UPF device, in a backbone network.

The GTP may encapsulate PDUs, and provide encapsulation on a per PDU session level and also carry marking associated with a quality of service (QoS) flow.

5G encapsulation: A 5G encapsulation layer supports multiplexing traffic of different PDU sessions (possibly corresponding to different PDU session types) over N9, for example, an interface between different UPFs in a 5G CN. The 5G encapsulation provides encapsulation on a per PDU session level. The 5G encapsulation layer may also carry marking associated with a QoS flow.

5G AN protocol stack: This stack is a set of protocols and layers dependent on an AN. The number of UPF devices in a data path is not restricted. In a case in which there is an UL CL or a branching point in a data path of a PDU session, the UL CL or the branching point acts as an UPF device corresponding to non-PSA. In that case, there are multiple N9 interfaces branching out of the UL CL or the branching point each leading to different PSAs.

Figure 5:
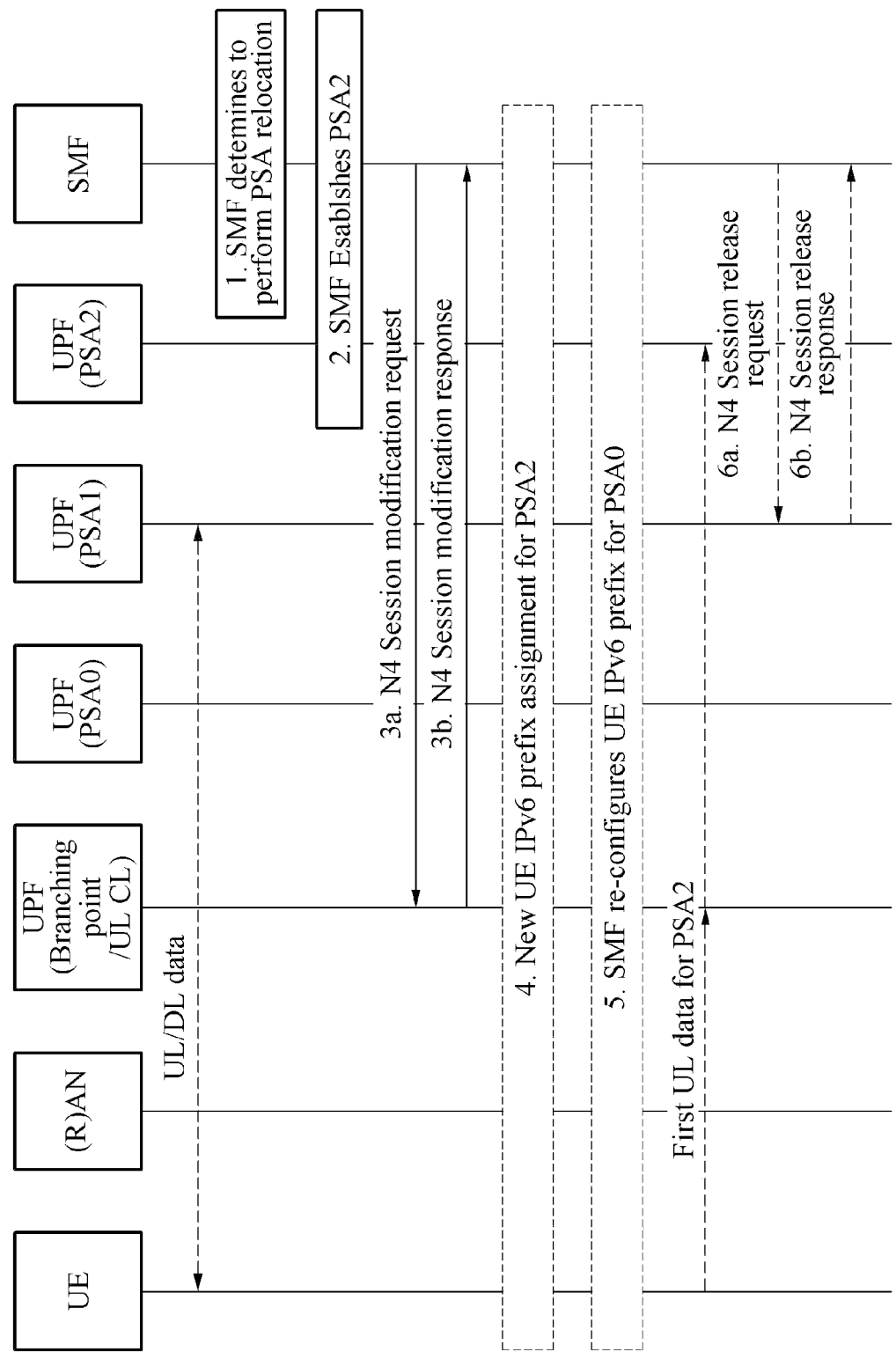
FIG. 5 is a diagram illustrating a process of PDU session anchor (PSA) relocation according to an example embodiment.

FIG. 5 is a diagram illustrating a process of PSA relocation according to an example embodiment.

A process of PSA relocation illustrated in FIG. 5 may be triggered by an SMF device. A process of additional PSA relocation described with reference to FIG. 5 may be independent of an SSC mode of a PDU session.

Herein, when the SMF device needs to modify an IPv6 multihoming or UL CL rule, the SMF device performs the PSA relocation. The IPv6 multihoming or UL CL rule may be a traffic filter in IPv6 multihoming or an UL CL.

When there is a need to modify the IPv6 multihoming or UL CL rule, an additional PSA is established by the IPv6 multihoming or the UL CL and some or whole traffic moves to the additional PSA. In FIG. 5, PSA1 and PSA2 indicate additional PSAs. In detail, PSA1 indicates an existing PSA, and PSA2 indicates a new PSA. Both PSA1 and PSA2 are established by a same branching point or UL CL.

Hereinafter, the branching point or the UL CL may indicate an UPF device corresponding to the branching point or the UL CL.

Step 1

The SMF device determines to perform additional PSA relocation due to events that may benefit from PSA relocation for IPv6 multihoming or UL CL, or due to a request from an application function via the SMF device.

Step 2

The SMF device transmits an N4 session establishment request to PSA2 and provides PSA2 with a tunnel identifier (ID) of a branching point or an UL CL to be installed, and packet detection, enforcement, and reporting rules. When a tunnel ID is allocated by the SMF, the tunnel ID is provided to PSA2 in this step. PSA2 acknowledges this by transmitting an N4 session establishment response. The tunnel ID of PSA2 is provided to the SMF device in this step.

In a case of an IPv6 multihoming PDU session, the SMF device allocates a new IPv6 prefix corresponding to PSA2.

Step 3a

The SMF device transmits an N4 session modification request to the branching point or the UL CL to update an UL traffic filter according to the new IPv6 prefix allocated to PSA2 or an UL CL rule regarding a traffic flow that the SMF device tries to move from PSA1 to PSA2. The N4 session modification request includes IDs of traffic filters that need the PSA relocation and the tunnel ID of PSA2 so that the branching point or the UL CL updates PSA2 to an N9 interface for the traffic filters that need the PSA relocation.

An ID of a traffic filter may be one of an index of the traffic filter, a single value of an information field in the traffic filter (e.g., a tunnel ID of a next hop), and a combination value of some information field in the traffic filter (e.g., a tunnel ID of a next hop with a source port number).

Step 3b

When the branching point or the UL CL successfully updates all the traffic filters that the SMF requests the modification, the branching point or the UL CL acknowledges the modification with an N4 session modification response.

Step 4

In a case of the IPv6 multihoming PDU session, the SMF device notifies UE of availability of the new IP prefix at PSA2. This is performed using an IPv6 router advertisement message. Also, the SMF device transmits a routing rule along with the IPv6 prefix to the UE using the IPv6 router advertisement message. In a case of an UL CL PDU session, step 4 may be omitted.

Step 5

In a case of the IPv6 multihoming PDU session, the SMF device reconfigures the UE for the original IP prefix at PSA0. For example, the SMF device transmits a routing rule along with the IPv6 prefix to the UE using the IPv6 router advertisement message.

Step 6

This step occurs only if the branching point or the UL CL does not have any traffic filter on the PDU session that forwards a traffic flow to PSA1. The SMF device selectively releases an existing PSA.

Step 6a

The SMF device transmits an N4 session release request with an N4 session ID to PSA1. PSA1 releases all tunnel resources and contexts associated with the N4 session.

Step 6b

When PSA1 successfully release all the tunnel resources and contexts associated with the N4 session, PSA1 transmits an N4 session release response with the N4 session ID to the SMF device.

Figure 6:
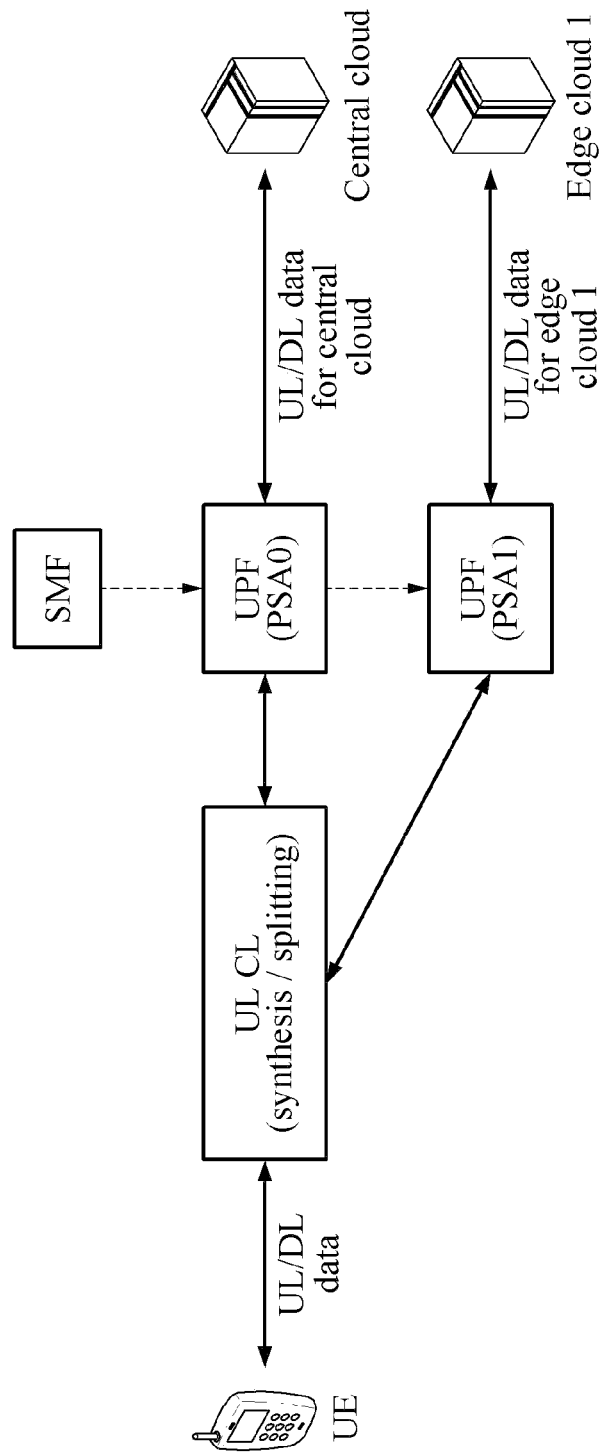
FIG. 6 is a diagram illustrating a basic situation of a CN according to an example embodiment.
Figure 7:
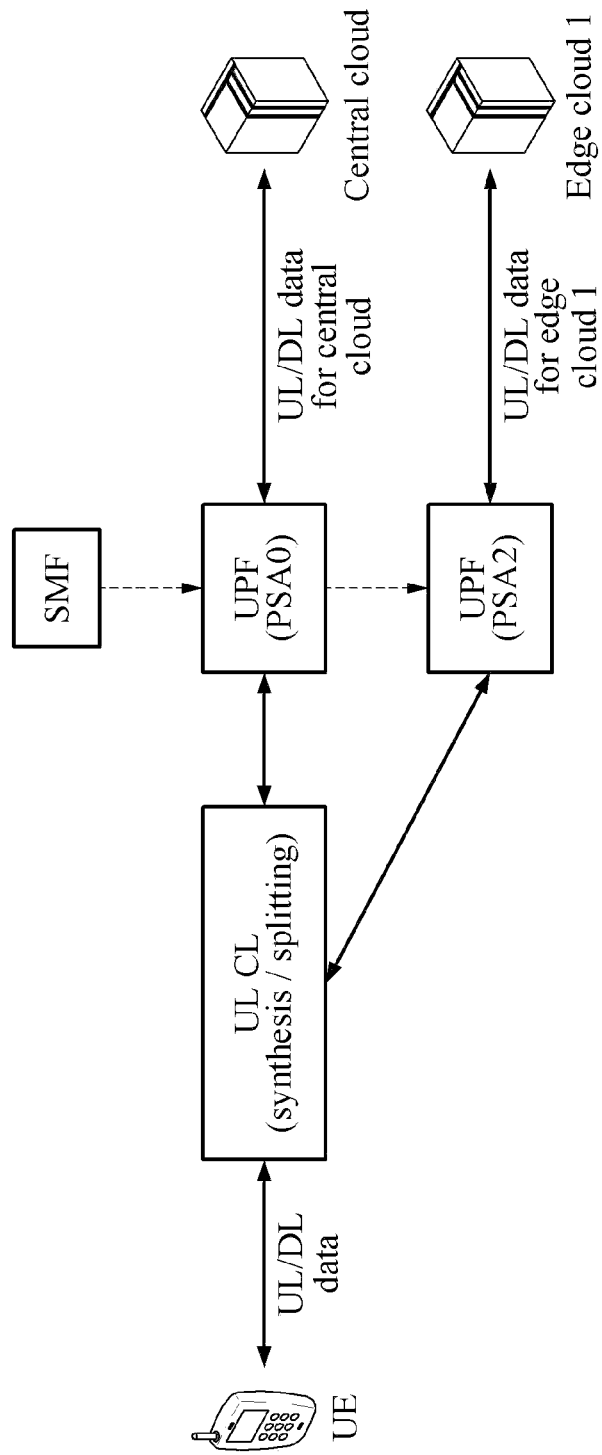
FIG. 7 is a diagram illustrating a first scenario for load balancing according to an example embodiment.
Figure 8:
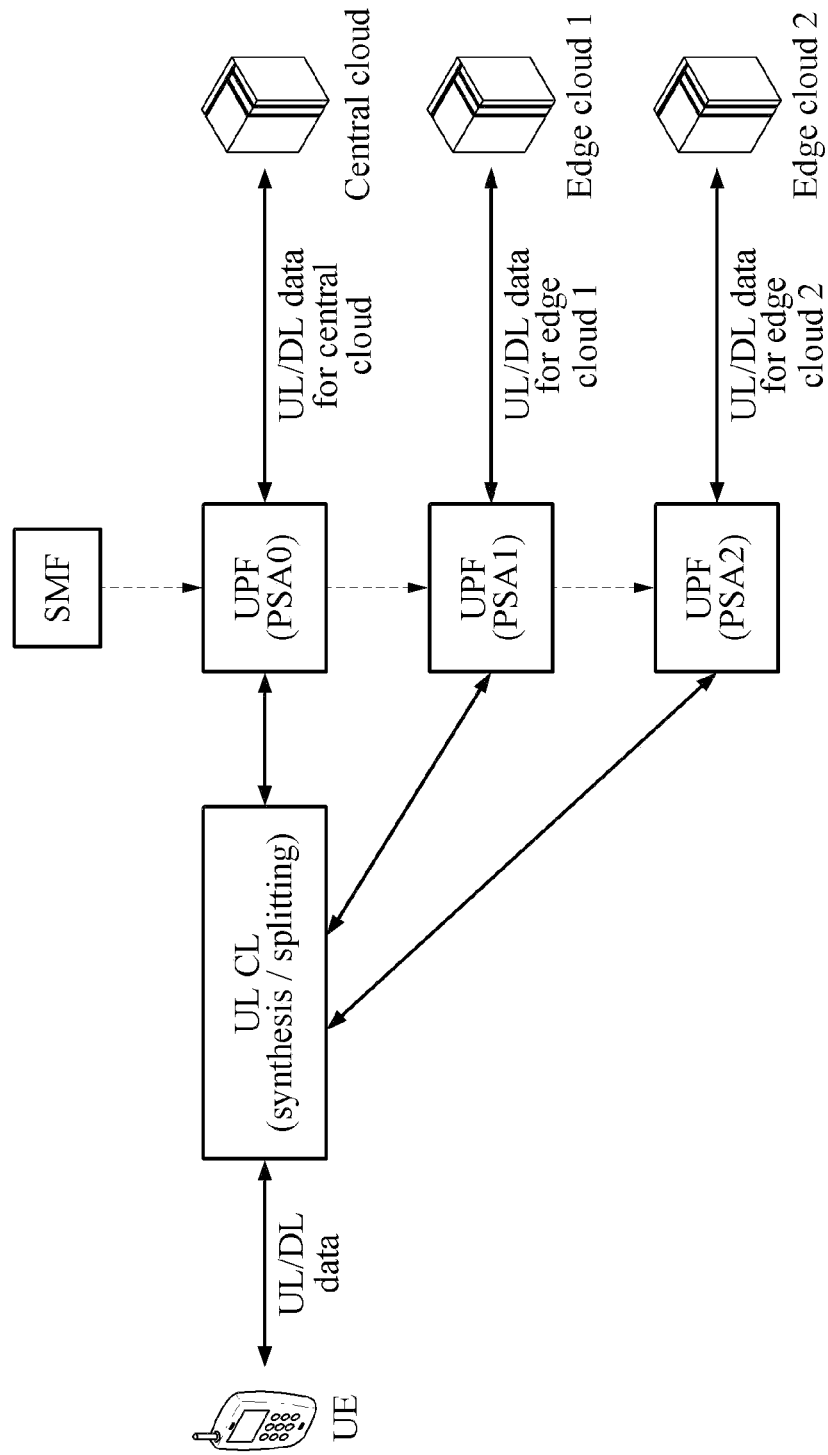
FIG. 8 is a diagram illustrating a second scenario for load balancing according to an example embodiment.

FIGS. 6 through 8 are diagrams illustrating examples of load balancing through edge computing.

An edge cloud and a central cloud for the edge computing may correspond to a DN described with reference to FIGS. 1 through 5. In detail, the edge cloud corresponds to a local DN, and the central cloud corresponds to a common DN such as the Internet.

Referring to FIG. 6, UE receives a service from the edge cloud and the central cloud through a 5G CN.

The operations of each of components or elements illustrated in FIGS. 6 through 8 are described as follows.

1) Uplink classifier (UL CL): An UP CL is a virtualized UPF and present between an RAN and a 5G gateway, and is configured to transmit UL traffic of the UE to a predetermined gateway based on a set rule and synthesize DL traffic received through different gateways to transmit it to the UE.

2) User plane function (UPF) 0 (PSA0): PSA0 acts as a gateway of the 5G network to connect the UE and the central cloud, and has an IP address for a corresponding session.

3) UPF (PSA1): PSA1 acts as a gateway of the 5G network to connect the UE to edge cloud 1, and has an IP address such as UPF0 for a corresponding session.

4) Edge cloud or edge cloud 1: As an external 5G DN having a same DNN as that of the central cloud, and the edge cloud provides some of services of the central cloud or locally specified service.

5) Session management function (SMF) device: As a function of managing a session of the UE in the 5G CN, the SMF connects the UE to the central cloud and the edge cloud by controlling UPFs through the SMF.

Referring to FIG. 7, new gateway UPF2 is set to connect to a new edge cloud, or edge cloud 2, in a 5G CN in order to distribute load concentrated on a central cloud or edge cloud 1. Referring to FIG. 8, in a case in which a gateway is generated (e.g., UPF (PSA2)) and released (e.g., UPF (PSA1)) due to load balancing or a lifecycle of a virtualized 5G gateway (UPF), a service that is provided once through UPF(PSA1) is provided through UPF(PSA2) as UPF(PSA1) is replaced with UPF(PSA2).

The processes described above are as follows.

(i) An SMF device determines that there is a need to connect a new local gateway, UPF(PSA2), for a corresponding PDU session, based on a load of a central cloud and edge cloud 1, or on a lifecycle of UPF (PSA1). That is, the SMF device determines whether there is a need for PSA relocation.

(ii) The SMF device selects a 5G gateway, UPF(PSA2), to connect a new local gateway, and sets a tunnel ID of the UPF device.

(iii) The SMF device requests an UL CL to set a rule to select traffic to be transmitted to the newly set UPE (PSA2) for edge cloud 2 or 1. The rule may be set based on an index of a previous rule or a tunnel ID of a next hope, or a single value of a port number or a combination of each value.

(iv) When all traffic is moved to UPF(PSA0) or UPF (PSA2) through (iii), for example, scenario 2, the SMF device releases UPF(PSA1). However, when the UE still receives a service from edge cloud 1 through UPF(PSA1) even after (iii), the SMF device does not perform (iv) and not release UPF(PSA1).

According to example embodiments described herein, load balancing between UPFs in an edge cloud or a 5G CN may be enabled, and a quality of an edge service through the 5G CN may also be enhanced.

In addition, through a 5G edge computing signaling method that is adaptive to network dynamics, such as, a change in lifecycle of a virtualized UPF (e.g., generation, scaling up and down, and release or disappearance of the UPF), virtualization of the 5G CN providing an edge service may be supported.

The methods described herein may be configured as programs implementable in a computer, and embodied through various recording media, such as, for example, a magnetic storage medium, an optical read medium, a digital storage medium, and the like.

According to example embodiments described herein, when there is a plurality of edge clouds in a 5G CN system, load balancing between the edge clouds may be enabled by changing an edge cloud or resetting a 5G local gateway to support a lifecycle of a virtualized 5G local gateway.

According to example embodiments described herein, although new UE, in addition to existing UE, is connected in a 5G CN system, a service that is flexible to a load and connected or continuous despite a movement of UE may be provided by resetting a 5G local gateway.

The components described in the example embodiments of the present disclosure may be achieved by hardware components including at least one of a digital signal processor (DSP), a processor, a controller, an application specific integrated circuit (ASIC), a programmable logic element such as a field programmable gate array (FPGA), other electronic devices, and combinations thereof. At least some of the functions or the processes described in the example embodiments of the present disclosure may be achieved by software, and the software may be recorded on a recording medium. The components, the functions, and the processes described in the example embodiments of the present disclosure may be achieved by a combination of hardware and software.

The processing device described herein may be implemented using hardware components, software components, and/or a combination thereof. For example, the processing device and the component described herein may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method to be performed by a session management function (SMF) device in a network, the method comprising:
   determining PDU (Protocol Data Unit) session anchor relocation;
   transmitting session establishment request to a new PSA (PDU Session Anchor) device;
   transmitting a session modification request to an UL_ (Uplink) CL_(Classifier)_to update an UL traffic filter according to an UL CL rules regarding a traffic flow;
   receiving a session modification response; and
   transmitting a session release request with a session ID (identifier) to an existing PSA (PDU Session Anchor) device,
   wherein the traffic flow is related to movement from the existing PSA device to the new PSA device.

2. The method of claim 1, further comprising:
   receiving a session release response with a session ID from the existing PSA device, when the existing PSA device release successfully releases all tunnel resources and contexts associated with the session.

3. The method of claim 1, wherein the SMF device is configured to perform the PSA relocation in response to an event benefiting from the PSA relocation for the IPV6 multihoming or the uplink classifier or a request from an application function.

4. The method of claim 1, wherein the SMF device is configured to transmit a session establishment request to the new PSA device, and provide the new PSA device with a tunnel identifier (ID) of a branching point to be installed, an uplink classifier, and packet detection, enforcement, and reporting rules.

5. The method of claim 1, wherein the SMF device is configured to transmit, to a user plane function (UPF) device corresponding to a branching point or an uplink classifier, a session modification request in accordance with a new IPv6 prefix allocated to the new PSA device to update the UL traffic filter.

6. The method of claim 5, wherein the session modification request includes an ID of the UL traffic filter for which the PSA relocation is needed and a tunnel ID of the new PSA device.

7. The method of claim 5, wherein, when the UPF device corresponding to the branching point or the uplink classifier successfully updates all the UL traffic filters for which the SMF device requests modification, the UPF device corresponding to the branching point or the uplink classifier is configured to acknowledge the modification with a session modification response.

8. The method of claim 1, wherein the SMF device is configured to transmit, to the existing PSA device, a session release request including a session ID, and the existing PSA device is configured to release tunnel resources and contexts associated with the PDU session.

9. The method of claim 8, wherein, when the existing PSA device successfully releases the tunnel resources and contexts associated with the PDU session, the existing PSA device is configured to transmit a session release response including the session ID to the SMF device.

10. The method of claim 1, wherein the network is configured to support a session and service continuity (SSC) mode associated with the PDU session,
wherein the SSC mode does not change during a lifetime of the PDU session.

11. A session management function (SMF) device in a network, the SMF device configured to:
determine PDU (Protocol Data Unit) session anchor relocation;
transmit session establishment request to a new PSA (PDU Session Anchor) device;
transmit a session modification request to an UL_(Uplink) CL_(Classifier) to update an UL traffic filter according to an UL CL rules regarding a traffic flow;
receive a session modification response; and
transmit a session release request with a session ID (identifier) to an existing PSA (PDU Session Anchor) device,
wherein the traffic flow is related to movement from the existing PSA device to the new PSA device.

12. The SMF device of claim 11, further configured to:
receive a session release response with a session ID from the existing PSA device, when the existing PSA device release successfully releases all tunnel resources and contexts associated with the session.

13. The SMF device of claim 11, configured to perform the PSA relocation in response to an event benefiting from the PSA relocation for the IPV6 multihoming or the uplink classifier or a request from an application function.

14. The SMF device of claim 11, configured to transmit a session establishment request to the new PSA device, and provide the new PSA device with a tunnel identifier (ID) of a branching point to be installed, an uplink classifier, and packet detection, enforcement, and reporting rules.

15. The SMF device of claim 11, configured to transmit, to a user plane function (UPF) device corresponding to a branching point or an uplink classifier, a session modification request in accordance with a new IPV6 prefix allocated to the new PSA device to update the UL traffic filter.

16. The SMF device of claim 15, wherein the session modification request includes an ID of the UL traffic filter for which the PSA relocation is needed and a tunnel ID of the new PSA device.

17. The SMF device of claim 15, wherein, when the UPF device corresponding to the branching point or the uplink classifier successfully updates all the UL traffic filters for which the SMF device requests modification, the UPF device corresponding to the branching point or the uplink classifier is configured to acknowledge the modification with a session modification response.

18. The SMF device of claim 11, configured to transmit, to the existing PSA device, a session release request including a session ID, wherein the existing PSA device is configured to release tunnel resources and contexts associated with the PDU session.

19. The SMF device of claim 18, wherein, when the existing PSA device successfully releases the tunnel resources and contexts associated with the PDU session, the existing PSA device is configured to transmit a session release response including the session ID to the SMF device.

20. The SMF device of claim 11, wherein the network is configured to support a session and service continuity (SSC) mode associated with the PDU session,
wherein the SSC mode does not change during a lifetime of the PDU session.

* * * * *